(12) United States Patent
Satou

(10) Patent No.: US 6,594,076 B2
(45) Date of Patent: Jul. 15, 2003

(54) MICROSCOPE

(75) Inventor: Manabu Satou, Yokosuka (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/775,659

(22) Filed: Feb. 5, 2001

(65) Prior Publication Data
US 2001/0012152 A1 Aug. 9, 2001

(30) Foreign Application Priority Data
Feb. 9, 2000 (JP) .................................. 2000-032114

(51) Int. Cl.⁷ ............................ G02B 21/00; G02B 21/06
(52) U.S. Cl. .................. 359/388; 359/368; 359/385; 359/614
(58) Field of Search .......................... 359/368–390, 359/601–602, 614–615

(56) References Cited

U.S. PATENT DOCUMENTS

| | | | | |
|---|---|---|---|---|
| 4,185,902 A | * | 1/1980 | Plaot | 359/614 |
| 4,779,968 A | * | 10/1988 | Sander | 359/389 |
| 5,335,098 A | * | 8/1994 | Leyva et al. | |
| 5,335,114 A | * | 8/1994 | Suzuki | 359/614 |
| 5,371,624 A | * | 12/1994 | Nagano et al. | 359/389 |
| 5,631,767 A | * | 5/1997 | Dodge et al. | |
| 6,219,189 B1 | * | 4/2001 | Tomimatsu et al. | 359/659 |
| 6,276,804 B1 | * | 8/2001 | Tandler et al. | 359/385 |

FOREIGN PATENT DOCUMENTS

| | | | | |
|---|---|---|---|---|
| DE | 2055944 | * | 5/1972 | 359/388 |
| JP | A 9-281399 | | 10/1997 | |

* cited by examiner

Primary Examiner—Thong Nguyen
(74) Attorney, Agent, or Firm—Oliff & Berridge, PLC

(57) ABSTRACT

An epi-fluorescence microscope includes: a light guiding device that guides illuminating light emitted by a light source by reflecting the illuminating light to implement epi-lighting on a test piece, and guides fluorescent light excited by the illuminating light and generated from the test piece to an observation unit by allowing the fluorescent light to be transmitted; and an inclined member that is provided on an optical path of transmitted light which is a part of the illuminating light and has been transmitted through the light guiding device instead of being reflected by the light guiding device, and has a surface inclined relative to the optical path.

9 Claims, 10 Drawing Sheets

MICROSCOPE

INCORPORATION BY REFERENCE

The disclosure of the following priority application is herein incorporated by reference:
Japanese Patent Application No. 2000-032114 filed Feb. 9, 2000

BACKGROUND OF THE INVENTION

1. Field of the Invention

The present invention relates to a microscope mainly used in the fields of biology and medicine, which may be, for instance, an epi-fluorescence microscope (or a top-lighting fluorescence microscope) employed to observe a test piece with the fluorescent light originating from the test piece being lit from above with excitation light.

2. Description of the Related Art

There is a method of fluorescence microscopy in the known art in which a specific tissue in a test piece is dyed with a reagent coupled with a fluorescent dye and the specific tissue is observed with the fluorescent light generated by the reagent by irradiating excitation light on the test piece. An illumination optical system in an epi-fluorescence microscope used in the fluorescent microscopy method comprises a light source, an excitation filter, a dichroic mirror and an absorption filter. The excitation filter allows only light (excitation light) having a wavelength effective for generating fluorescent light from the fluorescent dye in the test piece, in the light emitted by the light source, to be transmitted. The dichroic mirror is positioned at a 45° angle of inclination relative to the optical axis of the observation optical system constituted of the objective optical system and the eyepiece optical system of the epi-fluorescence microscope, and the excitation light is reflected by the dichroic mirror to be guided to the test piece. The excitation light thus guided to the test piece causes the dye in a specific tissue to generate fluorescent light. The wavelength of this fluorescent light is larger than the wavelength of the excitation light, and the dichroic mirror mentioned above achieves spectral transmission characteristics that allow the fluorescent light to be transmitted. The absorption filter is provided on the optical path of the observation optical system located between the dichroic mirror and the eyepiece optical system to eliminate any superfluous excitation light component reflected by the test piece or the like and traveling toward the eyepiece optical system.

By employing the epi-fluorescence microscope described above, a clear observation image can be obtained since the specific tissue which generates light can be observed in a field of perfect black.

However, the contrast of the observation image may become lowered if part of the excitation light is guided to the eyepiece optical system. For instance, after part of the excitation light that has been transmitted through the dichroic mirror and has advanced linearly is reflected by the wall surface present behind the dichroic mirror, it is reflected at the rear surface of the dichroic mirror and is guided to the eyepiece optical system. Hereafter in this specification, the excitation light, which is not reflected by the dichroic mirror and is transmitted through the dichroic mirror to reach the eyepiece optical system as described above is referred to as "stray light".

The absorption filter is provided to absorb such stray light to prevent it from entering the eyepiece optical system. However, if the spectral transmission characteristics of the absorption filter are those achieved by an interference filter that are determined in conformance to the film thickness of the interference film instead of those achieved by a so-called dye filter, desired spectral transmission characteristics cannot be realized with regard to light entering diagonally relative to the light entry surface of the absorption filter. Since the excitation light reflected by the wall surface mentioned earlier undergoes irregular reflection at the wall surface, not all the excitation light entering the light entry surface of the absorption filter advances in the direction perpendicular to the entry surface. As a result, some of the excitation light is transmitted through the absorption filter and advances toward the eyepiece optical system as stray light.

The quantity of the fluorescent light originating from the dye material is extremely small, at $10^{-6} \sim 10^{-9}$ relative to the quantity of the excitation light set at 1. Thus, the effect of the stray light advancing toward the eyepiece optical system as described above on the observation image cannot be disregarded.

SUMMARY OF THE INVENTION

An object of the present invention is to provide a microscope capable of minimizing the degree to which the contrast of the observation image is lowered by illuminating light entering the eyepiece optical system.

In order to attain the above object, an epi-fluorescence microscope according to the present invention comprises: a light guiding device that guides illuminating light emitted by a light source by reflecting the illuminating light to implement epi-lighting on a test piece, and guides fluorescent light excited by the illuminating light and generated from the test piece to an observation unit by allowing the fluorescent light to be transmitted; and an inclined member that is provided on an optical path of transmitted light which is a part of the illuminating light and has been transmitted through the light guiding device instead of being reflected by the light guiding device, and has a surface inclined relative to the optical path.

In this epi-fluorescence microscope, it is preferred that the inclined member attenuates the transmitted light and reflects an attenuated transmitted light by the inclined surface along a direction other than a direction toward the light guiding device. In this case, it is preferred that the epi-fluorescence microscope further comprises a light attenuating member that is provided on an optical path of the attenuated transmitted light having been reflected by the inclined member to further attenuate the attenuated transmitted light.

Another epi-fluorescence microscope according to the present invention comprises: a light guiding device that guides illuminating light emitted by a light source by reflecting the illuminating light to implement epi-lighting on a test piece, and guides fluorescent light excited by the illuminating light and generated from the test piece to an observation unit by allowing the fluorescent light to be transmitted; and a frame body that holds the light guiding device on an optical axis of an observation optical system, and an opening is provided at a wall surface of the frame body intersecting an optical path of transmitted light that is a part of the illuminating light and has been transmitted through the light guiding device instead of being reflected at the light guiding device.

In this epi-fluorescence microscope, it is preferred that a light attenuating device that is provided rearward of the opening to prevent the transmitted light from being reflected to advance toward the light guiding device, is further provided. Or, it is preferred that a reflecting device that is provided rearward of the opening to bend the optical path of the transmitted light by reflecting the transmitted light, is further provided.

Another epi-fluorescence microscope according to the present invention comprises: a light guiding device that guides illuminating light emitted by a light source by reflecting the illuminating light to implement epi-lighting on a test piece, and guides fluorescent light excited by the illuminating light and generated from the test piece to an observation unit by allowing the fluorescent light to be transmitted; a frame body that hods the light guiding device on an optical axis of an observation optical system; a first light attenuating device that is provided on an optical path of transmitted light which is a part of the illuminating light and has been transmitted through the light guiding device instead of being reflected by the light guiding device, and attenuates a quantity of the transmitted light; and one or more second light attenuating devices that are provided on an optical path along which light having been attenuated at the first light attenuating device advances, and further attenuates a quantity of an attenuated transmitted light.

Another epi-fluorescence microscope according to the present invention comprises: a plurality of light guiding devices each provided to guide illuminating light emitted by a light source by reflecting the illuminating light to implement epi-lighting on a test piece, and guide fluorescent light excited by the illuminating light and generated from the test piece to an observation unit by allowing the fluorescent light to be transmitted; a holding device that selectively holds one of the plurality of light guiding devices at an optical axis of an observation optical system; and a light attenuating device that prevents transmitted light, which is a part of the illuminating light entering the light guiding device held at the optical axis and has been transmitted through the held light guiding device instead of being reflected by the held light guiding device, from being reflected to be allowed to advance toward the light guiding device.

In this epi-fluorescence microscope, it is preferred that: the holding device is a turret device capable of rotating around a rotational axis extending almost parallel to the optical axis of the observation optical system and having the plurality of light guiding devices mounted radially along an arch around the rotational axis; and the light attenuating device is provided near the rotational axis.

Also, it is preferred that the light attenuating device is commonly utilized regardless of which of the plurality of light guiding devices is held at the optical axis of the observation optical system.

A microscope according to the present invention comprises: a light guiding device that guides illuminating light emitted from a light source to illuminate a test piece and guides light from the test piece toward an observation unit; and a member that is provided at a position outside an observation optical path and having a surface inclined relative to an optical path of the light guiding device. And: the light guiding device guides the illuminating light to an objective lens group which irradiates the test piece and guides a part of the illuminating light to a position other than the objective lens group to result in generation of stray light; and the stray light is eliminated at a preceding stage before the stray light enters the objective lens group by the member having the inclined surface.

Another microscope according to the present invention comprises: a light guiding device that guides illuminating light emitted from a light source to illuminate a test piece and guides light from the test piece toward an observation unit; and a stray light attenuating device that is provided on an optical path of stray light which is a part of the illuminating light that has not been guided by the light guiding device to illuminate the test piece, and has a reflecting surface which inclines at a specific angle of inclination relative to the optical path of the stray light so that the stray light is not guided back to the light guiding device.

In this microscope, it is preferred that the reflecting surface of the stray light attenuating device comprises a member that attenuates the stray light and reflects attenuated stray light along a direction other than a direction toward the light guiding device.

DESCRIPTION OF THE PREFERRED EMBODIMENTS

First Embodiment

Figure 1:
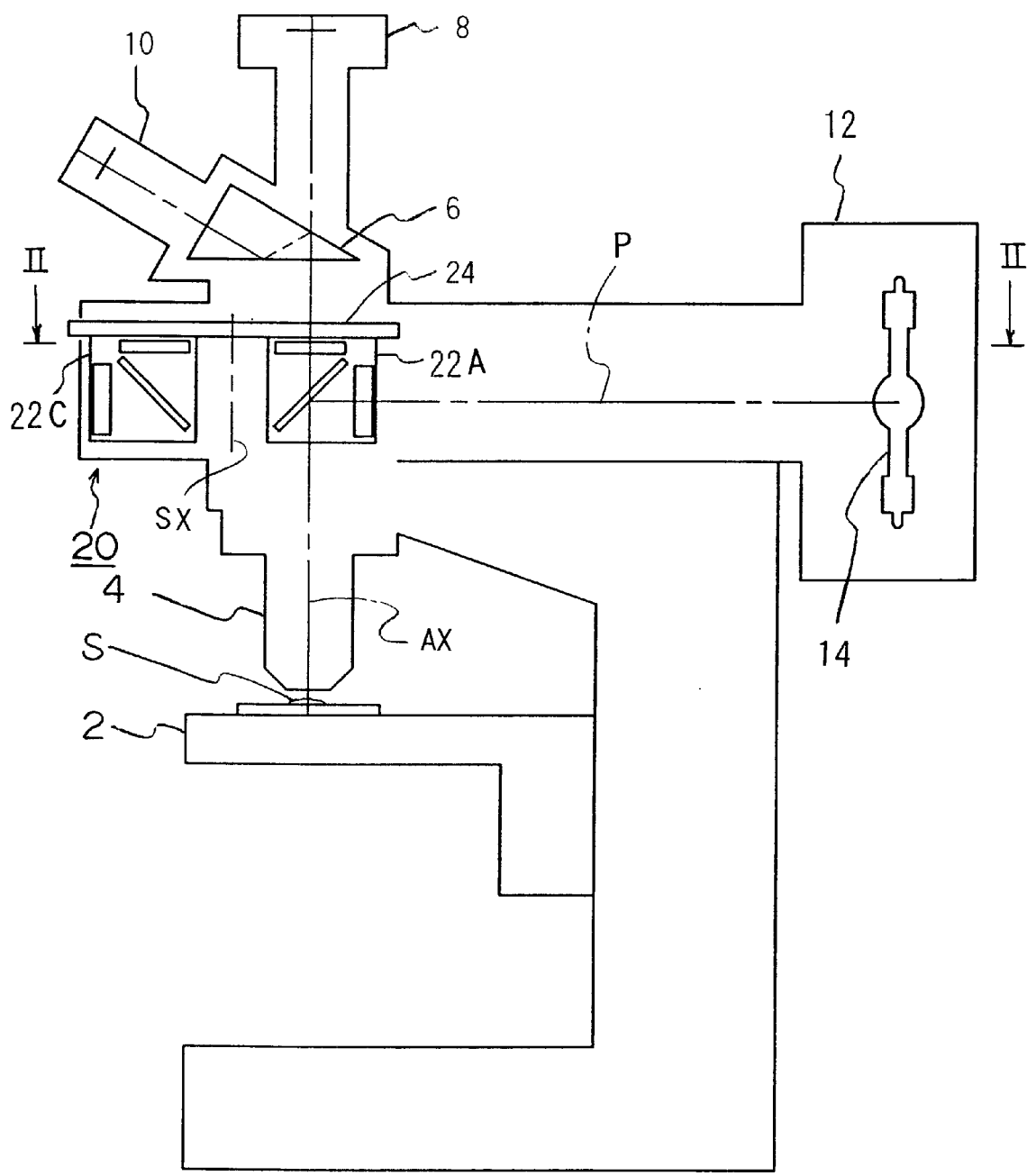
FIG. 1 schematically illustrates the structure of the epi-fluorescence microscope in an embodiment of the present invention.

FIG. 1 schematically illustrates the structure of the epi-fluorescence microscope in an embodiment of the present invention. In this epi-fluorescence microscope, a test piece (or specimen) S placed on a stage 2 is lit from above by converting light emitted by a light source unit 12 to excitation light at a fluorescence filter device 20 and an enlarged image of the test piece S is obtained through an objective lens 4 and an eyepiece lens 10. Lighting onto the test piece through the objective lens 4 in the epi-fluorescence microscope is referred to as epi-lighting (or top-lighting). In other words, the objective lens 4 has also a function irradiating light onto the test piece in epi-lighting. In the upright epi-fluorescence microscope as shown in FIG. 1, light is irradiated from above through the objective lens 4 onto the test piece. On the other hand, in an inverted epi-fluorescence microscope, light is irradiated from below through an objective lens onto a test piece.

An extra-high pressure mercury lamp 14 is mounted at the light source unit 12, and light emitted by the extra-high pressure mercury lamp 14 first travels through a condenser optical system (not shown) to become parallel light, and then advances along an optical path P.

A revolver (turret) 24 is mounted at the epi-fluorescence microscope main body in such a manner that it is allowed to rotate around a rotational axis SX, with a plurality of filter cassettes (filter cassettes 22A and 22C are shown in FIG. 1) detachably mounted at the revolver 24. The user of the microscope rotates the revolver 24 to position one of the filter cassettes at an optical axis AX of the observation optical system. In FIG. 1, the filter cassette 22A is positioned at the optical axis AX.

Figure 2:
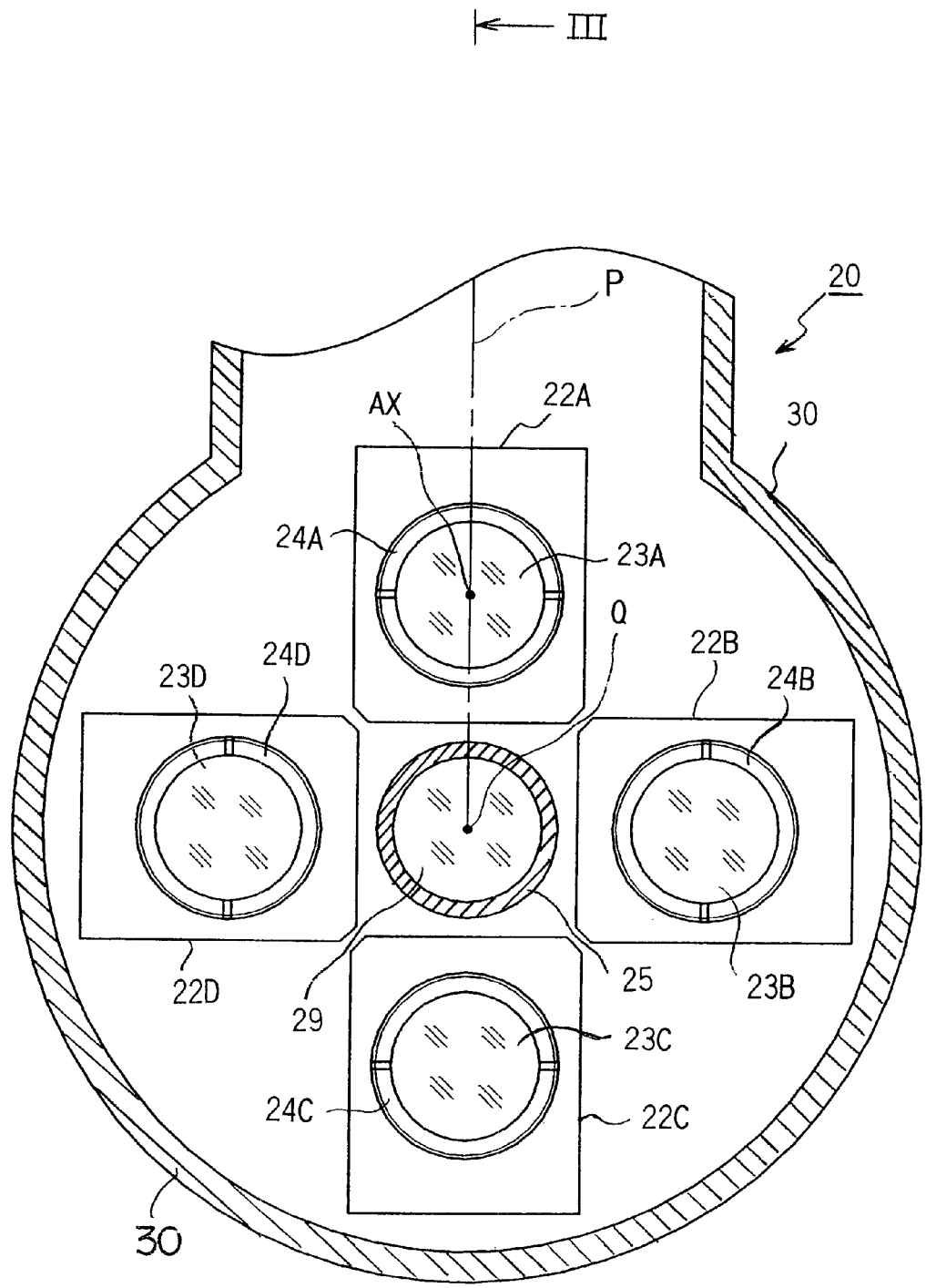
FIG. 2 schematically illustrates the structure of the fluorescence filter device mounted in the epi-fluorescence microscope in a first embodiment of the present invention, in a sectional view taken along II—II in FIG. 1.
Figure 3:
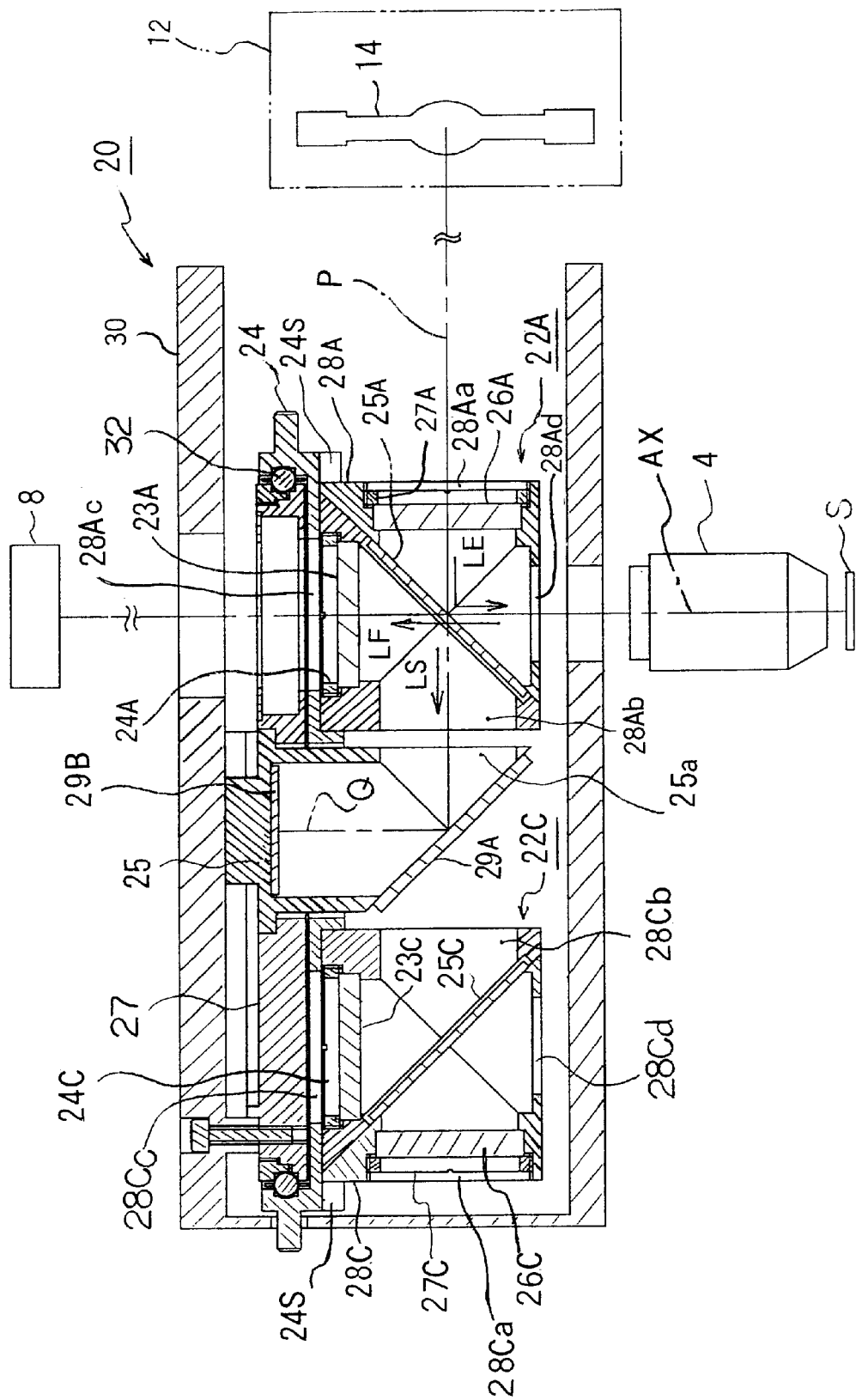
FIG. 3 schematically illustrates the structure of the fluorescence filter device mounted in the epi-fluorescence microscope in the first embodiment of the present invention, in a sectional view taken along III—III in FIG. 2.

In FIG. 2, which presents a partial sectional view taken along II—II in FIG. 2, four filter cassettes 22A, 22B, 22C and 22D are arrayed radially 90° intervals. In addition, FIG. 3 presents a sectional view taken along III—III in FIG. 2.

The following is a detailed explanation of the fluorescence filter device 20. As shown in FIG. 1, the fluorescence filter device 20 is provided between the eyepiece lens 10 and the objective lens 4 and guides excitation light toward the objective lens 4. As shown in FIG. 3, a retaining plate 27 is secured to a main body 30 together with a cylindrical unit 25. The disk-shaped revolver 24 is held by the retaining plate 27 via a bearing unit 32 so that the revolver 24 is allowed to rotate freely around the rotational axis SX shown in FIG. 1. The ball of the bearing unit 32 does not roll when it is in direct contact with the retaining plate 27 and the revolver 24. To explain this in more detail, a total of four ring-shaped piano wires is provided along the corners of the circular grooves having a rectangular cross section which are located at the external circumference of the retaining plate 27 and the internal circumference of the revolver 24, and these piano wires constitute rails along which the ball rolls. Thus, the retaining plate 27 and the revolver 24 may be constituted of a material such as aluminum or brass that achieves machinability and does not readily oxidize, and the need for heat treatment and the like can be eliminated. Four sets of slots 24s are formed radially over 90° intervals at the lower surface of the revolver 24, with the filter cassette 22A, 22B, 22C and 22D each detachably fitted in each of the slots.

The filter cassette 22A is explained below. A filter frame 28A having a roughly cubic external shape is hollow, and openings are provided at four of its surfaces. These openings are provided at the two surfaces intersecting the optical path P of the light source unit 12 and an extended line of the optical path P and at the two surfaces intersecting the optical axis AX of the observation optical system.

An excitation filter 26A, which allows only the excitation light component of the light emitted from the extra-high pressure mercury lamp 14 to be transmitted to the rear is mounted at an opening 28Aa, and the excitation filter 26A is secured with a holding ring 27A. An opening 28Ab provided at the surface facing opposite the excitation filter 26A remains free. An absorption filter 23A for absorbing a light component that should not be guided to the eyepiece lens 10 and a camera 8 and the like is mounted at an opening 28Ac located at the upper surface in FIG. 3, and the absorption filter 23A is secured with a holding ring 24A. An opening 28Ad provided at the surface facing opposite the absorption filter 23A remains free. A dichroic mirror 25A is provided inside the filter frame 28A, at a 45° angle of inclination relative to both the optical axis AX and the optical path P.

The other filter cassettes 22B, 22C and 22D assume structures similar to that of the filter cassette 22A, and by operating the revolver 24, one of the filter cassettes is moved to the position at which the filter cassette 22A is set in FIG. 3. The excitation filters 26A~26D, the absorption filters 23A~23D and the dichroic mirrors 25A~25D in these filter cassettes 22A~22D achieve spectral characteristics different from one another. For instance, by staining different portions of the cellular tissue such as mitochondria and golgi bodies with different fluorescence dyes and switching to one of the plurality of filter cassettes having different spectral characteristics from each other as described above to conduct an observation, it becomes possible to observe only a desired portion.

The cylindrical unit 25 provided near the center of the rotation of the revolver 24 is now explained. An opening 25a is provided at the cylindrical unit 25. This opening 25a is provided so as to communicate with the opening 28Ab set at the position facing opposite the light source unit 12 across the dichroic mirror 25A of the filter cassette currently in use (the filter cassette 22A in FIG. 3). In the lower portion of the cylindrical unit 25, a first light-absorbing member 29A which absorbs part of the light LS that advances after being transmitted through the dichroic mirror 25A and reflects the rest of the light to guide it so as to allow it to advance along an optical path Q in FIG. 3, is provided. The first light-absorbing member 29A may be an ND filter constituted of, for instance, colored glass. Through high light-absorption characteristics of the ND filter, most of the incident light can be absorbed at the first light-absorbing member 29A. An anti-reflection film may be formed at the surface to further enhance the light-absorption characteristics of the first light-absorbing member 29A. In addition, by setting the light entry surface of the first light-absorbing member 29A at an angle of inclination relative to the optical path of the light LS, advancing after having been transmitted through the dichroic mirror 25A, it is ensured that light that has not been absorbed by the first light-absorbing member 29A and has been reflected is allowed to travel back toward the dichroic mirror 25A.

On the optical path Q along which the light reflected by the first light-absorbing member 29A provided at an angle with respect to the optical path of the light LS advancing after having been transmitted through the dichroic mirror 25A as described above, a second light-absorbing member 29B is provided. The second light-absorbing member 29B may be constituted of velvet or flocked paper. Alternatively, instead of providing these members, a light-blocking line may be directly cut at the cylindrical unit 25, which may then be matte finished.

The light reflected by the first light-absorbing member 29A, which is already attenuated, is further attenuated at the second light-absorbing member 29B. A very small quantity of light reflected by the second light-absorbing member 29B travels backwards along the light path Q, and becomes even more attenuated when it is reflected at the first light-absorbing member 29A. Thus, the quantity of light traveling back toward the opening 28Ab is extremely small.

An explanation is given as to how the light is transmitted through the dichroic mirror 25A as described above, in reference to FIG. 4 presenting the spectral characteristics of the dichroic mirror and the absorption filter mounted at a filter cassette. In the graph presented in FIG. 4, the horizontal axis represents the wavelength and the vertical axis represents the transmittance. The explanation here is given by assuming that the spectral characteristics in FIG. 4 are those achieved by the dichroic mirror 25A and the absorption filter 23A mounted at the filter cassette 22A.

Figure 4:
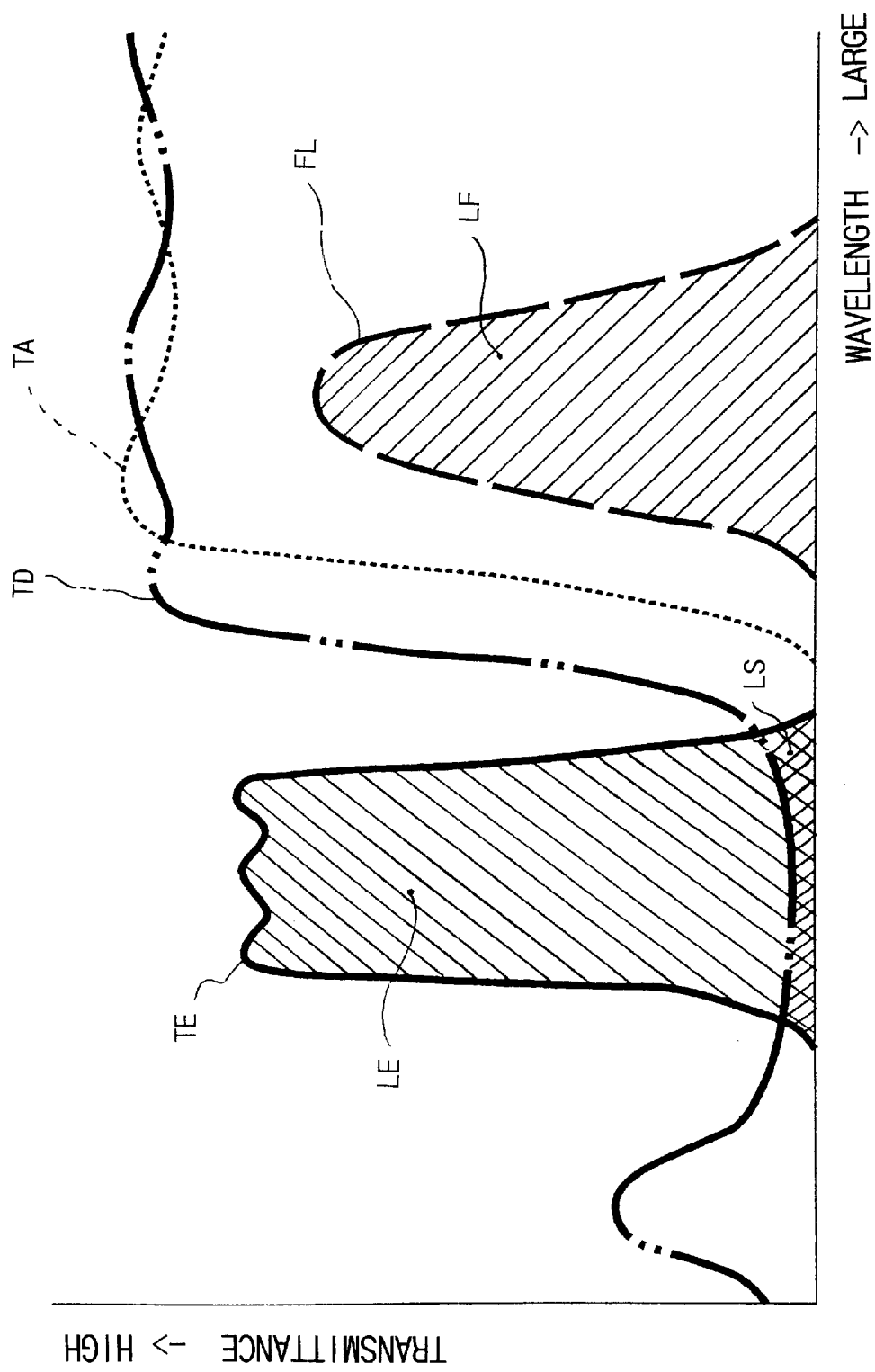
FIG. 4 illustrates the spectral characteristics of the dichroic mirror and the absorption filter.

In FIG. 4, the two-point chain line TD represents the spectral characteristics of the dichroic mirror 25A and the dotted line TA represents the spectral characteristics of the absorption filter 23A. The graph also shows the wavelength distributions (wavelength bands) of excitation light TE and fluorescent light FL.

The dichroic mirror 25A achieves spectral characteristics whereby the transmittance increases as the wavelength increases and the transmittance becomes lower, i.e., the reflectance increases, as the wavelength decreases. However, as shown in FIG. 4, the spectral transmittance of the dichroic mirror 25A is not a 0 in the wavelength band of the excitation light LE. For this reason, some of the light LS of the excitation light LE becomes transmitted through the dichroic mirror 25A. The light component in the excitation light LE, which is reflected at the dichroic mirror 25A, on the other hand, is guided to the test piece S via the objective lens 4.

The excitation light causes fluorescent light LF to be generated from the fluorescent dye in the test piece S, and the fluorescent light advances through the objective lens 4 in the upward direction in FIG. 3. In the wavelength band of the fluorescent light LF, the dichroic mirror 25A and the absorption filter 23A both demonstrate sufficiently high transmittance characteristics. As a result, the fluorescent light LF is transmitted through the dichroic mirror 25A and the absorption filter 23A and is guided to the eyepiece lens 10 or the camera 8 in FIG. 1. By taking advantage of the characteristics whereby the wavelength distribution of the fluorescent light LF is shifted toward the large wavelength side compared to the wavelength distribution of the excitation light LE as described above, the excitation light LE and the fluorescent light LF are guided along desired directions through the dichroic mirror 25A.

Let us consider a situation in which a wall surface is present instead of the opening 28Ab at the filter frame 28A. When the light LS that has not been reflected by the dichroic mirror 25A but has been transmitted through the dichroic mirror 25A is reflected at the wall surface and travels backward toward the dichroic mirror 25A, the light LS is reflected at the rear surface of the dichroic mirror 25A and advances along the upward direction in FIG. 3. This light LS should be absorbed by the absorption filter 23A achieving the spectral characteristics shown in FIG. 4. However, the light LS that has been irregularly (or diffusely) reflected at the wall surface and is, therefore, no longer parallel, enters the entry surface of the absorption filter 23A diagonally (not perpendicular to the entry surface). The absorption filter 23A is constituted of an interference filter whose spectral characteristics are controlled in conformance to the thickness of the thin film. As a result, the light that is transmitted diagonally through the absorption filter 23A as described above is transmitted diagonally through the thin film, manifesting a state equivalent to that in which the film thickness is larger. Thus, the spectral characteristics change with regard to the light diagonally transmitted through the absorption filter 23A, which prevents the light from becoming fully absorbed and allows it to be transmitted through the absorption filter 23A. This light becomes stray light constituting a flare component, which lowers the contrast of the observation image.

In contrast, in the epi-fluorescence microscope in the first embodiment, in which the opening 28Ab is provided to the rear of the filter frame 28A, i.e., at the surface facing opposite the light source unit 12 across the dichroic mirror 25A, the quantity of stray light described above is greatly reduced, so that the degree to which the contrast in the observation image is lowered is minimized.

The first light-absorbing member 29A provided to the rear of the opening 28Ab greatly reduces the quantity of stray light and light which has not been absorbed at the first light-absorbing member 29A is reflected toward the second light-absorbing member 29B where it is absorbed. Moreover, the light that has not been absorbed at the second light-absorbing member 29B and has been reflected to travel back toward the first light-absorbing member 29A is absorbed at the first light-absorbing member 29A, thereby further reducing the quantity of stray light.

Since the fluorescence filter device 20 explained above is provided as a separate unit which is independent of the objective lens 4, the magnification of the objective lens 4 can be changed with ease by mounting a plurality of objective lenses at the revolver and rotating the revolver. In addition, since the illumination range on the test piece S, too, is changed in correspondence to the magnification of the objective lens 4, a sufficient quantity of light can be guided to the test piece S when the magnification is set high. As a result, a clear observation image is obtained at all times.

Furthermore, the light that has been transmitted through the dichroic mirror in one of the filter cassettes selected from the plurality of filter cassettes 22A~22D is guided to the first light-absorbing member 29A and the second light-absorbing member 29B. In other words, since the cylindrical unit 25, the first light-absorbing member 29A and the second light-absorbing member 29B are utilized commonly regardless of which one of the plurality of filter cassettes 22A~22D is in use, a compact fluorescence filter device 20 is achieved. In addition, since the cylindrical unit 25, the first light-absorbing member 29A and the second light-absorbing member 29B are provided near the center of the rotation of the revolver 24, effective utilization of dead space is realized to keep down the size of the fluorescence filter device 20, which ultimately prevents the size of the entire epi-fluorescence microscope from increasing.

Second Embodiment

Figure 5:
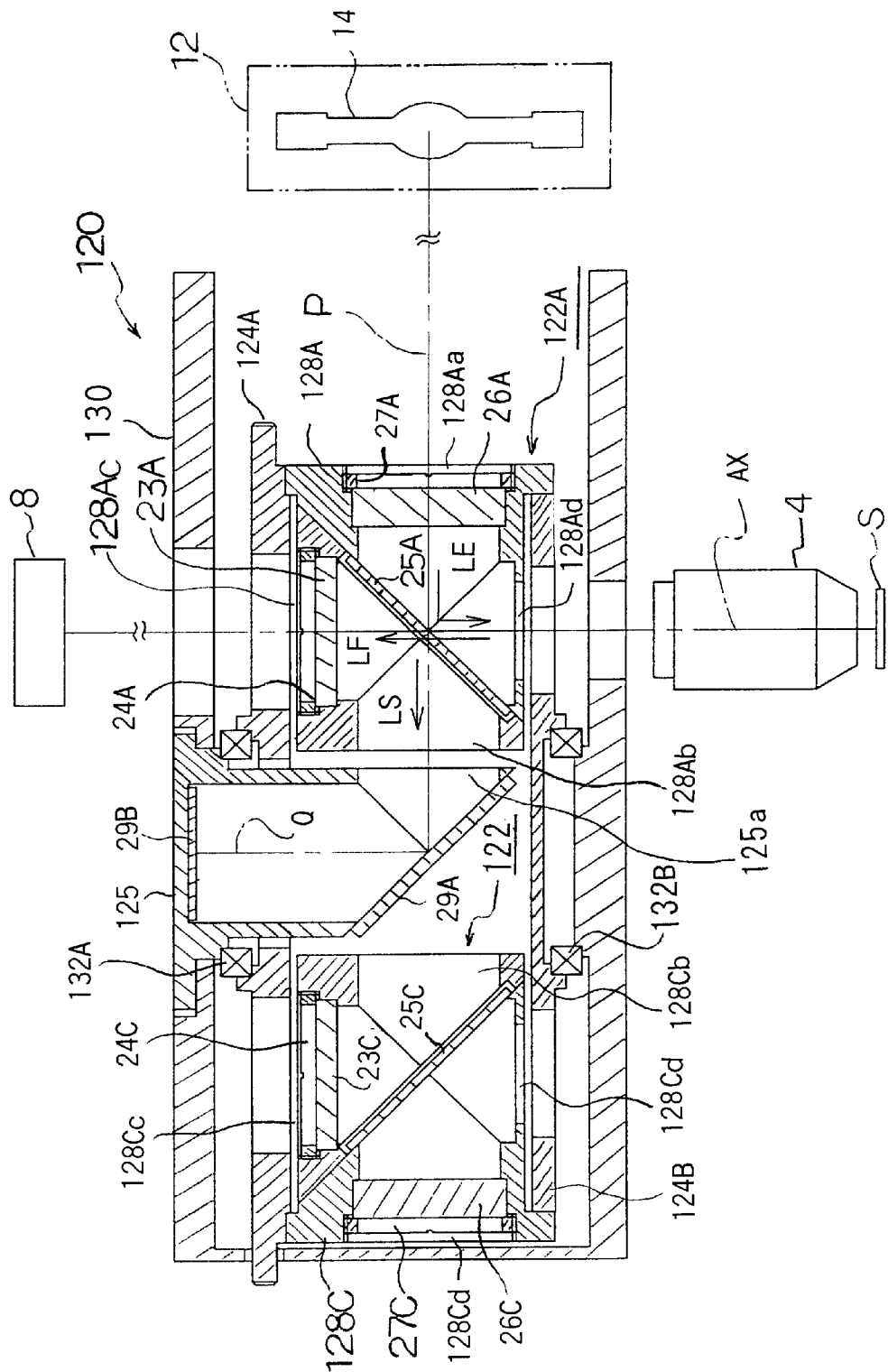
FIG. 5 schematically illustrates the structure of the fluorescence filter device mounted in the epi-fluorescence microscope in a second embodiment of the present invention.

FIG. 5 illustrates the structure of a fluorescence filter device 120 mounted in the epi-fluorescence microscope in the second embodiment of the present invention, presenting a sectional view similar to that in FIG. 3, which illustrates the fluorescence filter device 20 in the epi-fluorescence microscope in the first embodiment. In the fluorescence filter device 120 in FIG. 5, the same reference numbers are assigned to components identical to those in the fluorescence filter device 20 (see FIG. 3) mounted in the epi-fluorescence microscope in the first embodiment to preclude the necessity for their explanation, and an explanation is given below by focusing on the differences from the first embodiment.

In the fluorescence filter device 20 (see FIG. 3) mounted in the epi-fluorescence microscope in the first embodiment, the revolver 24 is supported by the retaining plate 27 via the bearing unit 32 provided near its external circumference. In the fluorescence filter device 120 mounted in the epi-fluorescence microscope in the second embodiment, on the other hand, revolvers 124A and 124B are supported respectively by a cylindrical unit 125 and the main body 30A via bearings unit 132A and 132B provided near the rotational centers of revolvers 124A and 124B so as to allow them to rotate freely around the rotational axis SX in FIG. 1. To explain this in further detail, the cylindrical unit 125 is secured to the main body 130, and the revolver 124A is rotatably supported by the cylindrical unit 125 via the bearing unit 132A. The revolver 124B is rotatably supported at the lower portion of the main body 130 via the bearing unit 132B. The revolvers 124A and 124B rotate as a single unit around the rotational axis SX (see FIG. 1).

Four filter cassettes 122A, 122B, 122C and 122D (only the filter cassettes 122A and 122C are shown in FIG. 5) are provided radially over 90° intervals in the space between the revolver 124A and the revolver 124B. The user operates the revolver 124A to position one of the filter cassettes at the optical axis AX of the observation optical system.

An explanation is given on the filter cassette 122A among the four filter cassettes 122A~122D as a typical example. As explained in reference to the first embodiment, at the four surfaces of a cubic filter frame 128A constituting the filter cassette 122A, which extend perpendicular to the sheet on which FIG. 5 is drawn, four openings 128Aa, 128Ab, 128Ac and 128Ad are provided. An excitation filter 26A is mounted at the opening 128Aa and is secured with a holding ring 27A. An absorption filter 23A is mounted at the opening 128Ac and is secured with a holding ring 24A. Inside the filter frame 128A, a dichroic mirror 25A is mounted at a 45° angle of inclination relative to the optical path P of illuminating light emitted by the light source unit 12, and excitation light LE, which has been reflected by the dichroic mirror 25A, travels through the opening 128Ad to advance toward the objective lens 4.

At the cylindrical unit 125, an opening 125a, through which light LS that advances through the opening 128Ab after having been transmitted through the dichroic mirror 25A instead of being reflected by the dichroic mirror 25A is guided into the cylindrical unit 125 is provided. Further inside beyond the opening 125a, a first light-absorbing member 29A is secured with its entry surface set at a 45° angle of inclination relative to the optical path of the light LS. Most of the light LS is absorbed at the first light-absorbing member 29A, and the remaining light is reflected and advances along the optical path Q to enter a second light-absorbing member 29B which is securely bonded to the cylindrical unit 125. Thus, the light LS, which would lower the contrast of the observation image, is absorbed at the first light-absorbing member 29A and the second light-absorbing member 29B and becomes attenuated.

Since the fluorescence filter device 120 described above, too, is provided as a separate unit, independent of the objective lens 4, as is the fluorescence filter device explained in reference to the first embodiment, the magnification of the objective lens 4 can be changed with ease by mounting a plurality of objective lenses at the revolver to allow the user to change the magnification by rotating the revolver. In addition, since the illumination range on the test piece S changes in correspondence to the magnification of the objective lens 4, a sufficient quantity of light can be guided to the test piece S even when the magnification is set high, thereby making it possible to obtain a clear observation image at all times.

Furthermore, the light having been transmitted through the dichroic mirror in a filter cassette selected from the plurality of filter cassettes 122A~122D is guided to the first light-absorbing member 29A and the second lightabsorbing member 29B as in the first embodiment. Namely, since the cylindrical unit 125, the first light absorbing member 29A and the second light-absorbing member 29B are commonly utilized regardless of which of the plurality of filter cassettes 122A~122D is in use, the size of the fluorescence filter device 120 is minimized. Moreover, since the cylindrical unit 125, the first light absorbing member 29A and the second light-absorbing member 29B are provided near the rotational centers of the of the revolvers 124A and 124B, effective utilization of dead space is achieved to prevent the fluorescence filter device 120 from becoming large and ultimately, to prevent the entire epi-fluorescence microscope from becoming large.

Third Embodiment

Figure 6:
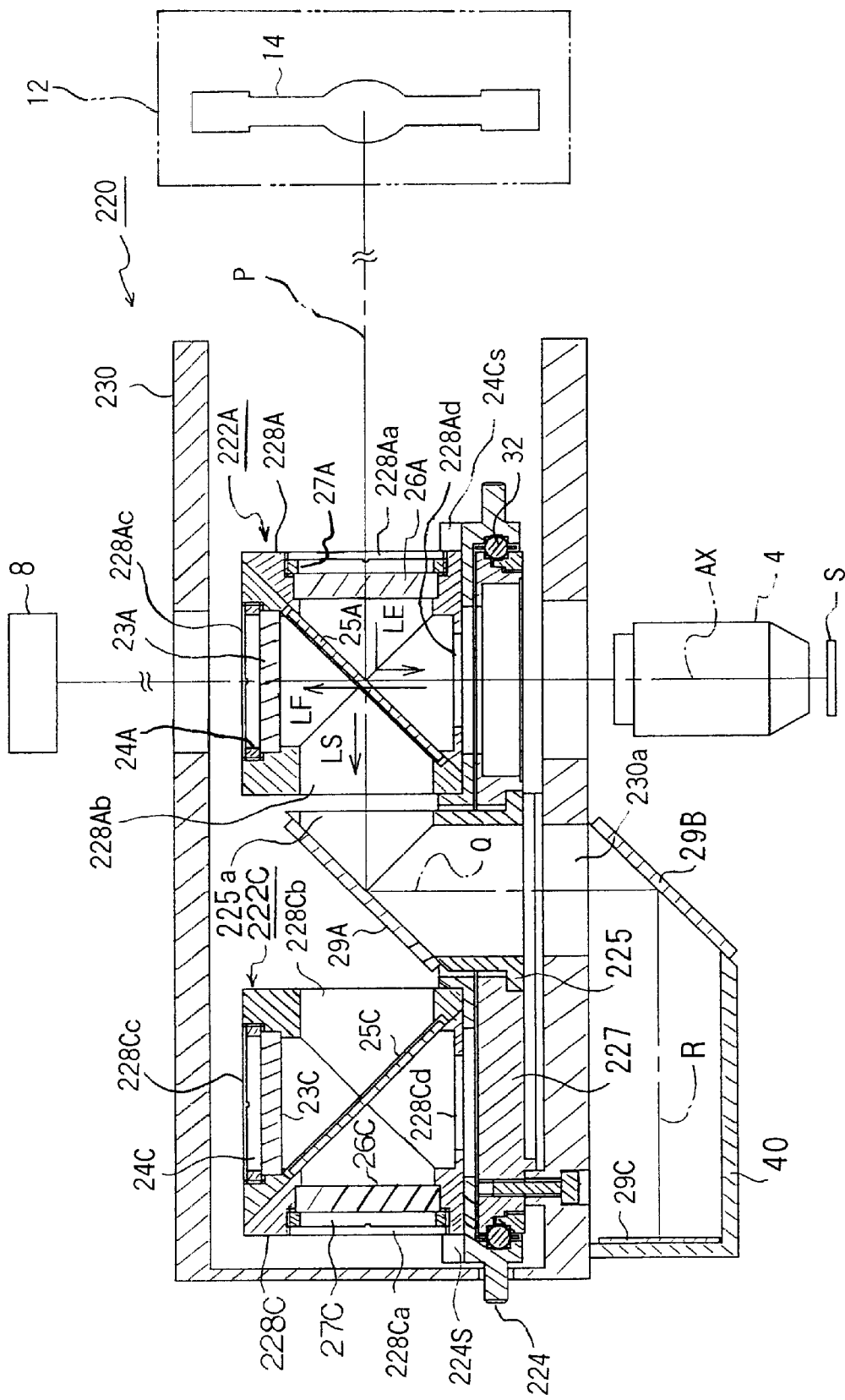
FIG. 6 schematically illustrates the structure of the fluorescence filter device mounted in the epi-fluorescence microscope in a third embodiment of the present invention.

FIG. 6 illustrates the structure of a fluorescence filter device 220 mounted in the epi-fluorescence microscope in the third embodiment of the present invention, presenting a sectional view similar to that in FIG. 3 which illustrates the fluorescence filter device 20 in the epi-fluorescence microscope in the first embodiment. In the fluorescence filter device 220 in FIG. 6, the same reference numbers are assigned to components identical to those in the fluorescence filter device 20 (see FIG. 3) mounted in the epi-fluorescence microscope in the first embodiment to preclude the necessity for their explanation, and an explanation is given below by focusing on the differences from the first and second embodiments.

In the fluorescence filter device 20 (see FIG. 3) mounted in the epi-fluorescence microscope in the first embodiment, the revolver is mounted at the retaining plate 27 secured to the main body 30 in a somewhat suspended state via the bearing unit 32. In contrast, in the fluorescence filter device 220 shown in FIG. 6, a revolver 224 is mounted so as to enclose a retaining plate 227 secured to the lower surface on the inside of a main body 230. The revolver 224 is supported via the bearing unit 32 in such a manner that it can rotate freely around the rotational axis SX in FIG. 1. Four sets of slots 224s are provided at the revolver 224 radially over 90° intervals, with filter cassettes 222A, 222B, 222C and 222D (only the filter cassettes 222A and 222C are shown in FIG. 6) each mounted at one of the slots 224s. The user rotates the revolver 224 to position one of the filter cassettes in the optical axis AX of the observation optical system.

An explanation is given on the filter cassette 222A among the four filter cassettes 222A~222D as a typical example. As explained in reference to the first embodiment, at the four surfaces of a cubic filter frame 228A constituting the filter cassette 222A, which extend perpendicular to the sheet on which FIG. 6 is drawn, four openings 228Aa, 228Ab, 228Ac and 228Ad are provided. An excitation filter 26A is mounted at the opening 228Aa and is secured with a holding ring 27A. An absorption filter 23A is mounted at the opening 228Ac and is secured with a holding ring 24A. Inside the filter frame 228A, a dichroic mirror 25A is mounted at a 45° angle of inclination relative to the optical path P of illuminating light emitted by the light source unit 12, and excitation light LE, which has been reflected by the dichroic mirror 25A, travels through the opening 228Ad to advance toward the objective lens 4.

A cylindrical unit 225 is secured to a main body 230 together with a retaining plate 227. At the cylindrical unit 225, an opening 225a through which light LS in the excitation light LE, that advances through the opening 228Ab after having been transmitted through the dichroic mirror 25A instead of being reflected by the dichroic mirror 25A is guided into the cylindrical unit 225 is provided. Further inward beyond the opening 225a, a first light-absorbing member 29A is secured with its entry surface at a 45° angle of inclination relative to the optical path of the light LS. In addition, an opening 230a is provided at the bottom of the main body 230. A box 40 which blocks light is secured to the bottom of the main body 230 while communicating with the inside of the cylindrical unit 225 via the opening 230a, and with a second light-absorbing member 29B secured at an opening portion of the box 40, a black box is formed.

Most of the light LS having been transmitted through the dichroic mirror 25A is absorbed at the first light-absorbing member 29A, and the remaining light is reflected and advances along the optical path Q to enter the second light-absorbing member 29B. The second light-absorbing member 29B, too, may be an ND filter constituted of colored glass, as is the first light-absorbing member 29A. However, it is desirable to cover the exterior (the surface facing opposite the reflection surface) of the second light-absorbing member 29B with a light-blocking material to ensure that light entering from the outside of the second light-absorbing member 29B is cut off. In order to further improve the light absorption characteristics of the second light-absorbing member 29B, an anti-reflection film may be formed at its surface as in the first light-absorbing member 29A.

The light that has not been absorbed at the second light-absorbing member 29B and has been reflected, advances along an optical path R. At a position intersecting the optical path R, a third light-absorbing member 29C is secured. The third light-absorbing member 29C may be constituted of velvet or flocked paper. Alternatively, instead of providing these members, a light-blocking line may be directly cut at the wall surface inside the box 40 intersecting the optical path R with a matte finish applied on the wall surface.

By adopting the structure described above, in the epi-fluorescence microscope in the third embodiment, too, the light LS which would lower the contrast of the observation image is absorbed at the first light-absorbing member 29A, the second light-absorbing member 29B and the third light-absorbing member 29C and thus becomes attenuated.

Since the fluorescence filter device 220 described above, too, is provided as a separate unit, independent of the objective lens 4, as are the fluorescence filter devices explained in reference to the first and second embodiments, the magnification of the objectives lens 4 can be changed with ease by mounting a plurality of objective lenses at the revolver to allow the user to change the magnification by rotating the revolver. In addition, since the illumination range on the test piece S changes in correspondence to the magnification of the objective lens 4, a sufficient quantity of light can be guided to the test piece S even when the magnification is set high, thereby making it possible to obtain a clear observation image at all times.

Furthermore, the light having been transmitted through the dichroic mirror in a filter cassette selected from the plurality of filter cassettes 222A~222D is guided to the first light-absorbing member 29A, the second light-absorbing member 29B and the third light-absorbing member 29C. Namely, since the cylindrical unit 225, the first light-absorbing member 29A, the second light-absorbing member 29B, the third light-absorbing member 29C and the box 40 are commonly utilized regardless of which of the plurality of filter cassettes 222A~222D is in use, the size of the fluorescence filter device 220 is minimized. Moreover, since the cylindrical unit 225 and the first light-absorbing member 29A are provided near the center of the rotation of the revolver 224, effective utilization of dead space is achieved to prevent the fluorescence filter device 220 from becoming large and ultimately, to prevent the entire epi-fluorescence microscope from becoming large.

Fourth Embodiment

Figure 7:
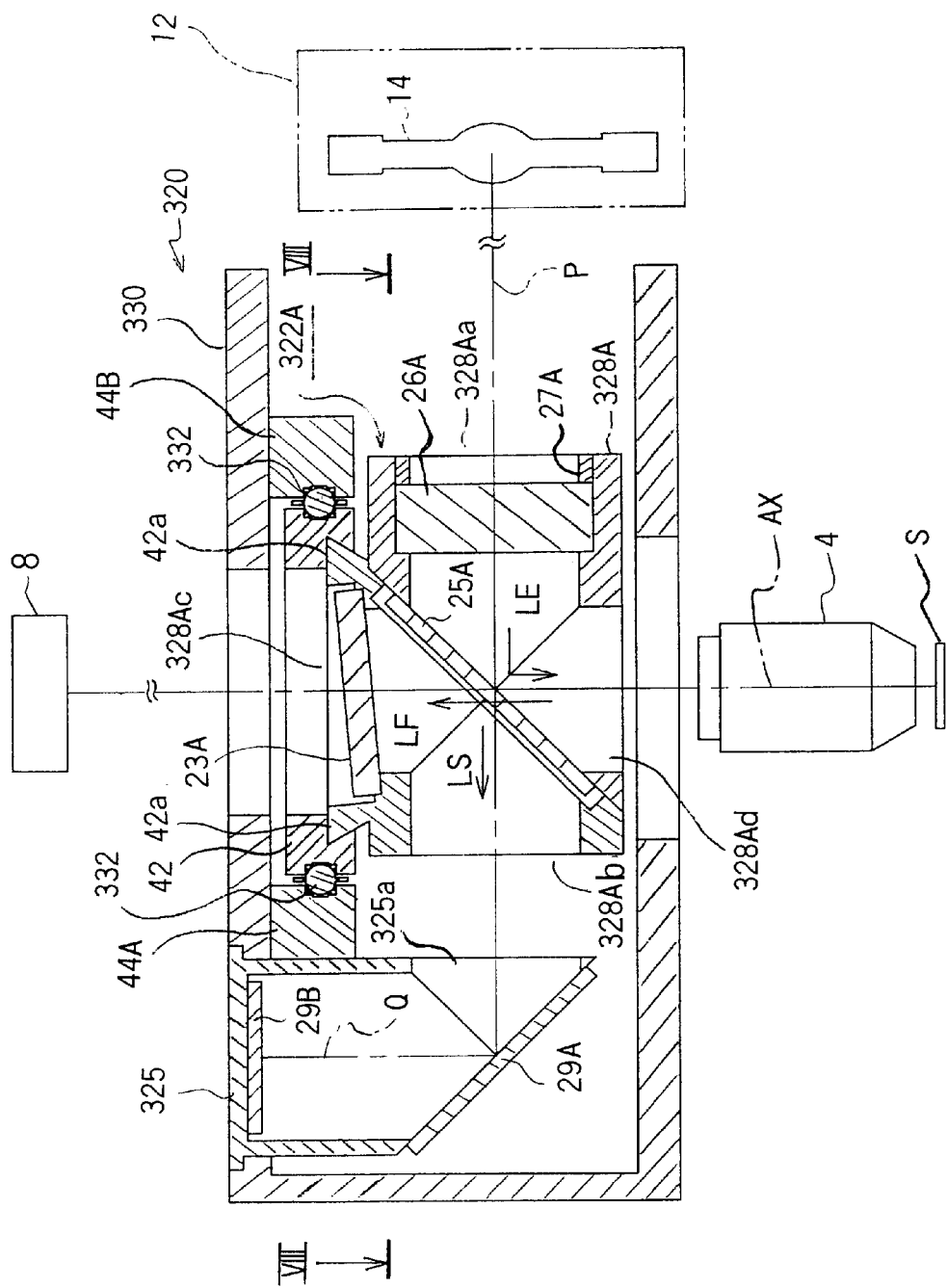
FIG. 7 schematically illustrates the structure of the fluorescence filter device mounted in the epi-fluorescence microscope in a fourth embodiment of the present invention.
Figure 8:
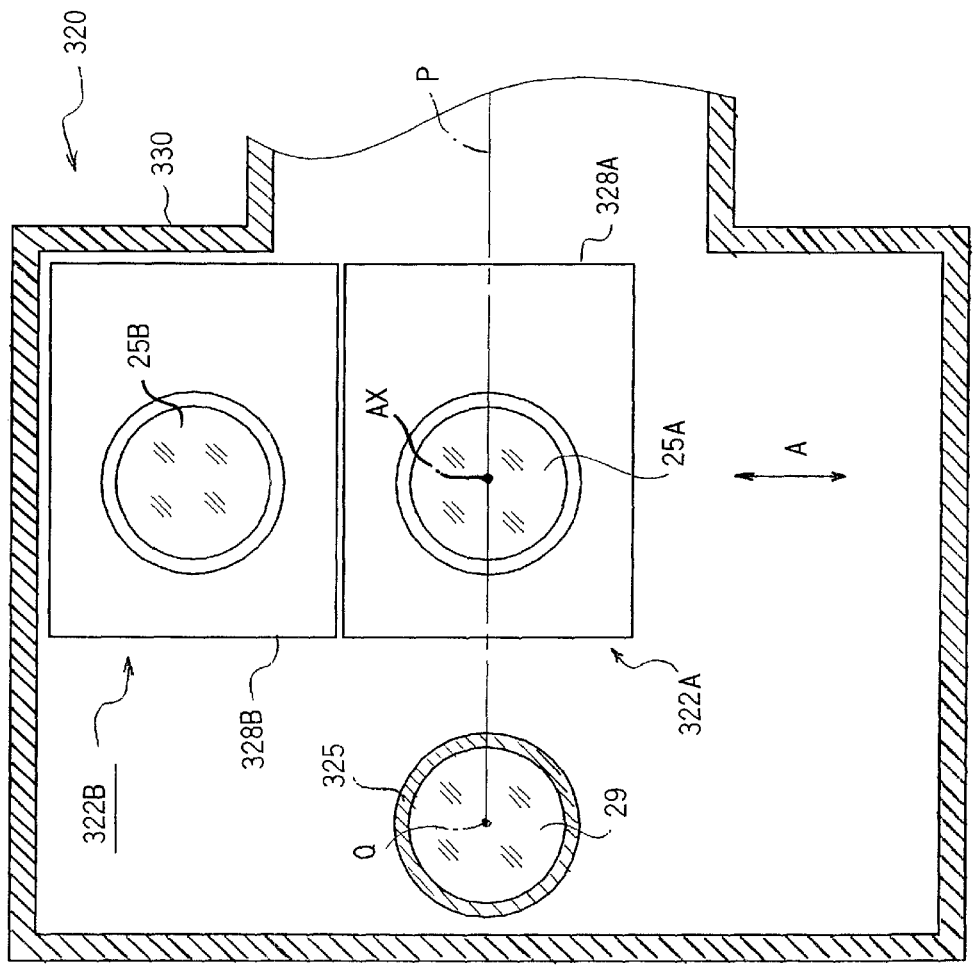
FIG. 8 schematically illustrates the structure of the fluorescence filter device mounted in the epi-fluorescence microscope in the fourth embodiment of the present invention, in a sectional view taken along VIII—VIII in FIG. 7.

FIG. 7 illustrates the structure of a fluorescence filter device 320 mounted in the epi-fluorescence microscope in the fourth embodiment of the present invention, presenting a sectional view similar to that in FIG. 3 which illustrates the fluorescence filter device 20 in the epi-fluorescence microscope in the first embodiment. FIG. 8 presents a sectional view taken along VIII—VIII in FIG. 7. In the fluorescence filter device 320 in FIGS. 7 and 8, the same reference numbers are assigned to components identical to those in the fluorescence filter device 20 (see FIG. 3) mounted in the epi-fluorescence microscope in the first embodiment to preclude the necessity for their explanation, and an explanation is given below by focusing on the differences from the first~third embodiments.

In the fluorescence filter device 20 mounted at the epi-fluorescence microscope in the first·third embodiments, one of the plurality of filter cassettes is selected by the user rotating the revolver to set it in the optical axis AX of the observation optical system. In the fluorescence filter device 320 mounted in the epi-fluorescence microscope in the fourth embodiment, on the other hand, a plurality of filter cassettes 322A and 322B are mounted at a switching frame 42 which makes linear movement along the direction perpendicular to the sheet on which FIG. 7 is drawn (the direction along the arrow A in FIG. 8). The user engages in a switching operation of the switching frame 42 along the direction perpendicular to the drawing sheet to set one of the filter cassettes in the optical axis AX. FIGS. 7 and 8 illustrate the filter cassette 322A set in the optical axis AX.

As shown in FIG. 7, at the inner top surface of a main body 330, two rail members 44A and 44B which extend along the direction perpendicular to the sheet on which FIG. 7 is drawn are mounted. At the rail members 44A and 44B, grooves having a rectangular cross section are formed along the direction in which the rail members 44A and 44B extend, with piano wires secured along the corners of the grooves.

The switching frame 42 having the cross sectional shape shown in FIG. 7 extends along the direction perpendicular to the sheets on which FIG. 7 is drawn, as do the rail members 44A and 44B. Two grooves having a rectangular cross section, which extend while facing opposite the grooves provided at the rail members 44A and 44B, are formed at the switching frame 42, with piano wires secured along with the corners of the grooves.

A linear bearing unit 332 is fitted in both the space having a rectangular cross section which is formed by the groove provided at the rail member 44A and the groove provided at the switching frame 42 to face opposite the groove at the rail member 44A and the space having a rectangular cross section which is formed by the groove provided at the rail member 44B and the groove formed at the switching frame 42 to face opposite the groove at the rail member 44B. In other words, the switching frame 42 is suspended and supported at the rail members 44A and 44B so as to allow it to move freely along the direction perpendicular to the sheet on which FIG. 7 is drawn via the bearing units 332. As the switching frame 42 moves, the balls at the bearing unit 332 roll on the rails formed with the piano wires described earlier. Thus, since the rail members of 44A and 44B and the switching frame 42 do not come into direct contact with the balls, they may be constituted of a relatively soft material which facilitates machining such as aluminum or brass. In addition, by constituting the rail members 44A and 44B and the switching frame 42 with carbon steel or the like it is not necessary to implement a heat treatment to improve the hardness of the ball rolling surfaces.

Dovetail grooves 42a are formed at the lower surface of the switching frame 42 to extend along the direction perpendicular to the sheet on which FIG. 7 is drawn, and the portion having a shape that fits the shape of the dovetail grooves is formed at the top of each of the filter cassettes 322A and 322B. As a result, the filter cassettes 322A and 322B can be mounted at the switching frame 42 by sliding them along the direction perpendicular to the sheet on which FIG. 7 is drawn.

An explanation is given on the filter cassette 322A of the two filter cassettes 322A and 322B as a typical example. As explained in reference to the first embodiment, at the four surfaces of a cubic filter frame 328A constituting the filter cassette 322A, which extend perpendicular to the sheet on which FIG. 7 is drawn, four openings 328Aa, 328Ab, 328Ac and 328Ad are provided. An excitation filter 26A is mounted at the opening 328Aa and is secured with a holding ring 27A. An absorption filter 23A is secured at the opening 328Ac at a specific angle of inclination relative to the optical axis AX of the observation optical system. Inside the filter frame 328A, a dichroic mirror 25A is mounted at a 45° angle of inclination relative to the optical path P of illuminating light emitted by the light source unit 12, and excitation light LE, which has been reflected by the dichroic mirror 25A, travels through the opening 228Ad to advance toward the objective lens 4.

A cylindrical unit 325 is secured to the main body 330 at a position on an extended line of the optical path P as shown in FIG. 8. At the cylindrical unit 325, an opening 325a through which a light LS in the excitation light LE that advances the opening 328Ab after having been transmitted through the dichroic mirror 25A instead of being reflected by the dichroic mirror 25A is guided into the cylindrical unit 325 is provided. Further inside beyond the opening 325a, a first light-absorbing member 29A is secured with its entry surface set at a 45° angle of inclination relative to the optical path of the light LS. Most of the light LS is absorbed at the first light-absorbing member 29A, and the remaining light is reflected and advances along the optical path Q to enter a second light-absorbing member 29B which is securely bonded to the cylindrical unit 325. Thus, the light LS, which would lower the contrast of the observation image, is absorbed at the first light-absorbing member 29A and the second light-absorbing member 29B and becomes attenuated.

Since the fluorescence filter device 320 described above, too, is provided as a separate unit, independent of the objective lens 4, as are the fluorescence filter devices explained in reference to the first~third embodiments, the magnification of the objective lens 4 can be changed with ease by mounting a plurality of objective lenses at the revolver to allow the user to change the magnification by rotating the revolver. In addition, since the illumination range on the test piece S changes in correspondence to the magnification of the objective lens 4, a sufficient quantity of light can be guided to the test piece S even when the magnification is set high, thereby making it possible to obtain a clear observation image at all times.

Furthermore, in the fourth embodiment, too, the light having been transmitted through the dichroic mirror in a filter cassette selected from the plurality of filter cassettes 322A and 322B is guided to the first light absorbing member 29A and the second light-absorbing member 29B. Namely, since the cylindrical unit 325, the first light-absorbing member 29A and the second light-absorbing member 29B are commonly utilized regardless of which of the plurality of filter cassettes 322A and 322B is in use, the size of the fluorescence filter device 320 is minimized and the production cost is kept down.

While an explanation is given above in reference to the first~fourth embodiments on an example in which so-called single-band filters are used, the use of multi-band filters, which allow excitation light having two or three wavelength ranges to be irradiated on a test piece, has become more common in recent years. Multi-band filters are often employed in conjunction with the FISH (fluorescence in situ hybridization) method which is suited for the observation of multi-stained chromosomes. An image observed through the FISH method must achieve a higher contrast (contrast ratio) than the contrast of an image observed through a standard fluorescence microscopic observation. However, the use of multi-band filters is often associated with a greater reduction in the contrast of the observation image compared to that associated with the use of single-band filters. Now, in reference to FIG. 9, the reason why the use of multi-band filters tends to lead to a pronounced reduction in the contrast of the observation image is explained.

Figure 9:
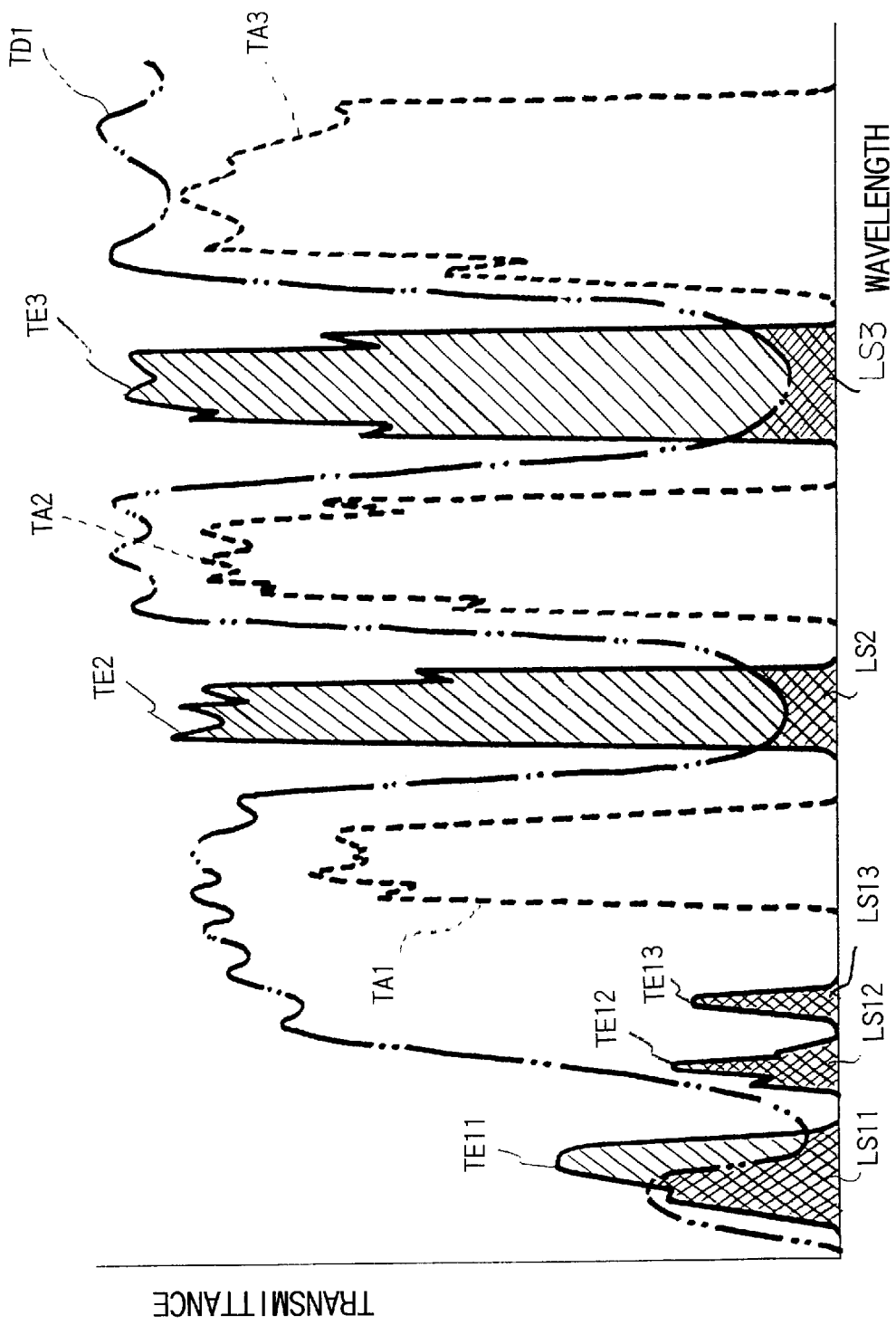
FIG. 9 illustrates the spectral characteristics of a multi-band filter.

FIG. 9 presents the spectral characteristics achieved at a multi-band dichroic mirror and a multi-band absorption filter mounted in the filter cassette, in the graph similar to that presented in FIG. 4. In FIG. 9, too, the horizontal axis represents the wavelength and the vertical axis represents the transmittance.

In FIG. 9, the two-point chain line TD1 represents the spectral characteristics of the dichroic mirror and the dotted lines TA1, TA2 and TA3 represent the spectral characteristics of the absorption filter. In the graph shown in FIG. 9, TE11, TE12, TE13, TE2 and TE3 indicate the wavelength bands of the excitation light. Light components LS11, LS12, LS13, LS2 and LS3 that are transmitted through the dichroic mirror instead of being reflected at the dichroic mirror in the excitation light are cross-hatched in FIG. 9. Since the quantity of light that is not reflected at the dichroic mirror and is allowed to be transmitted through the dichroic mirror to keep traveling forward increases as shown in the figure, a reduction in the contrast of the observation image is inevitable in the prior art. However, the light components LS11, LS12, LS13, LS2 and LS3 having been transmitted through that dichroic mirror are absorbed in the epi-fluorescence microscope according to the present invention, thereby greatly reducing the quantity of light traveling backward toward the dichroic mirror. As a result, the degree to which the contrast of the observation image is reduced can be minimized.

While an explanation is given in reference to the first~fourth embodiments above on an example in which the first light-absorbing member 29 is provided with its entry surface set at a 45° angle of inclination relative to the optical path of the light LS advancing after having been transmitted through the dichroic mirror 25A instead of being reflected by the dichroic mirror 25A, the angle of inclination (the angle of incidence) is not limited to 45°, and the angle of inclination may be varied in correspondence to the direction along which the light LS is to be guided.

In addition, the second light-absorbing member 29B shown in FIG. 3 and the like may be constituted of a frog (needle point holder) instead of constituting it with velvet or flocked paper or constituting it by directly cutting a light-blocking line and applying a matte finish. Also, the light LS may be effectively attenuated by cutting a light-blocking line and applying a matte finish at the wall surface enclosing the optical path of the light LS having been transmitted through the dichroic mirror or by pasting flocked paper or the like at the wall surface.

While an explanation is given above in reference to the embodiments on an example in which two or three light-absorbing members are provided to absorb the light LS having been transmitted through the dichroic mirror, the number of such light absorbing members is not limited to two or three. Furthermore, they may be set at angles of inclination relative to the optical path of the light LS other than the angle set in the embodiments and they may be constituted by adopting a combination of materials other than those used in the embodiments.

Furthermore, while an explanation is given in reference to the embodiments on an example in which a plurality of filter cassettes are detachably mounted at a switching unit such as a turret, a single filter cassette may be mounted or a plurality of filter cassettes may be fixed. In addition, the filter cassettes may be formed as an integrated part of the switching unit. When a plurality of filter cassettes are provided, the light-absorbing members described above may be provided for each of the filter cassettes. Moreover, the position at which the fluorescence filter device is mounted is not limited to the position assumed in the explanation above.

While an explanation is given above on an example in which the present invention is adopted in an epi-fluorescence microscope, it may also be adopted in a reflected illumination microscope in which normal light is guided to the test piece. Namely, in a reflected illumination microscope, a half mirror is provided instead of the dichroic mirror in the epi-fluorescence microscope explained above and no excitation filter or absorption filter is utilized. In such a case, light accounting for approximately half of the entire quantity of the light emitted by the light source unit is reflected by the half mirror and is guided toward the test piece, with the light accounting for the remaining half transmitted through the half mirror to become a cause for lowering the contrast of the observation image. By attenuating this transmitted light as described above, a clearer observation image of a metal specimen, a wafer used for semiconductor chip production or the like can be achieved.

In addition, the present invention may be adopted in various other types of microscopes such as inverted microscopes and confocal microscopes, in addition to the microscopes described above.

Figure 10:
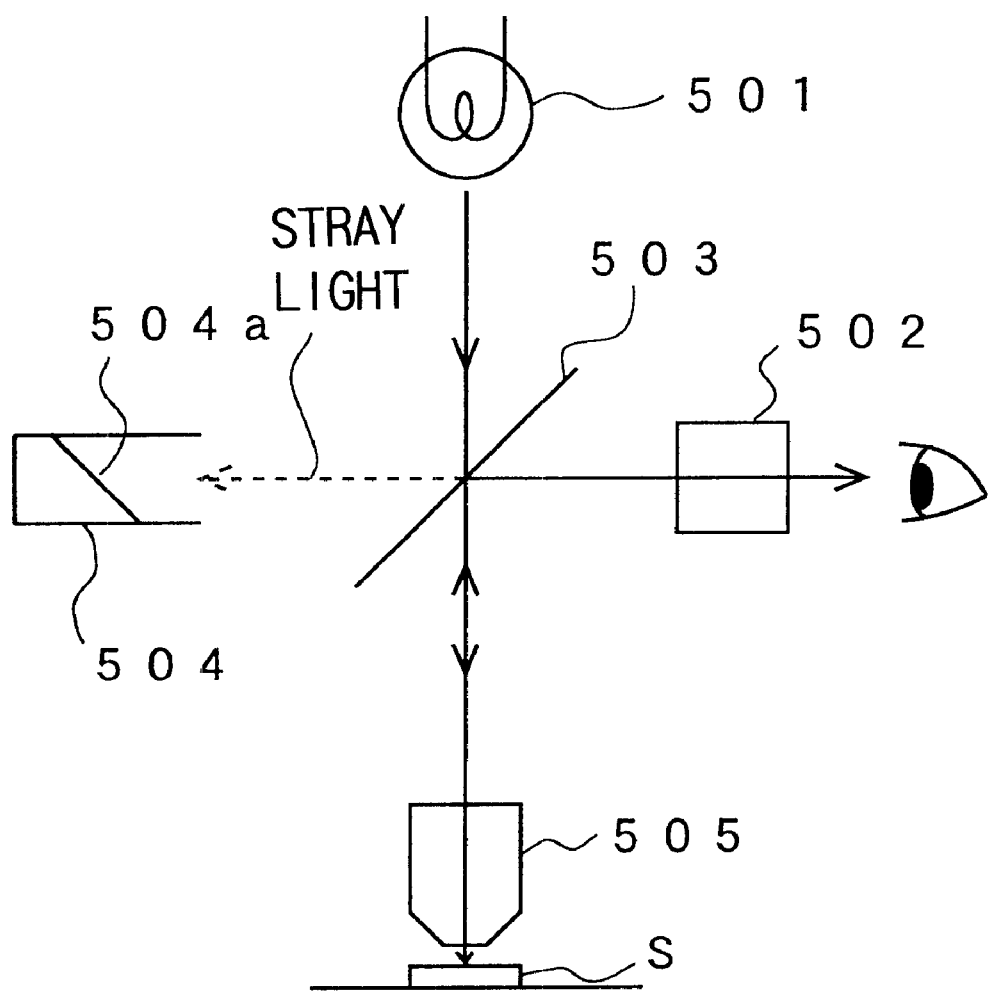
FIG. 10 schematically illustrates an example in which the present invention is adopted in another microscope.

FIG. 10 schematically illustrates an example of such application. The microscope shown in FIG. 10 is provided with a light source 501 that irradiates illuminating light on a test piece and a means for light guidance (e.g., a half mirror) 503 that guides the illuminating light emitted from the light source 501 so as to illuminate the test piece S and also guides the light from the test piece S to an observation unit 502. It is further provided with a member 504 having a surface inclined relative to the optical path of the means for light guidance 503, at a position outside the observation optical path. The means for light guidance 503 guides the illuminating light to an objective lens group 505 that irradiates the test piece S and also guides part of the illuminating light to a position other than the objective lens group 505 to generate stray light which is then eliminated at the preceding stage before it enters the objective lens group 505, i.e., at the member 504 having an inclined surface 504a.

What is claimed is:

1. An epi-fluorescence microscope comprising:
  a light guiding device that guides an illuminating light emitted by a light source by reflecting the illuminating light to implement an epi-lighting on a test piece, and guides a fluorescent light excited by the illuminating light and generated from the test piece to an observation unit by allowing the fluorescent light to be transmitted as a transmitted light; and
  a frame body that holds said light guiding device on an optical axis of an observation optical system, wherein an opening is provided at a wall surface of said frame body intersecting an optical path of the transmitted light that is a part of the illuminating light and has been transmitted through said light guiding device instead of being reflected at said light guiding device.

2. An epi-fluorescence microscope according to claim 1, further comprising:
  a light attenuating device that is provided rearward of said opening to prevent the transmitted light from being reflected to advance toward said light guiding device.

3. An epi-fluorescence microscope according to claim 1, further comprising:
  a reflecting device that is provided rearward of said opening to bend the optical path of the transmitted light by reflecting the transmitted light.

4. An epi-fluorescence microscope comprising:
  a light guiding device that guides an illuminating light emitted by a light source by reflecting the illuminating light to implement an epi-lighting on a test piece, and guides a fluorescent light excited by the illuminating light and generated from the test piece to an observation unit by allowing the fluorescent light to be transmitted as a transmitted light;
  a frame body that holds said light guiding device on an optical axis of an observation optical system;
  a first light attenuating device that is provided on an optical path of the transmitted light which is a part of the illuminating light and has been transmitted through said light guiding device instead of being reflected by said light guiding device, and attenuates a quantity of the transmitted light; and
  one or more second light attenuating devices that are provided on an optical path along which the illuminated light having been attenuated at said first light attenuating device advances, and further attenuates a quantity of an attenuated transmitted light.

5. An epi-fluorescence microscope comprising:
  a plurality of light guiding devices each provided to guide an illuminating light emitted by a light source by reflecting the illuminating light to implement an epi-lighting on a test piece, and guide a fluorescent light excited by the illuminating light and generated from the test piece to an observation unit by allowing the fluorescent light to be transmitted as a transmitted light;
  a holding device that selectively holds one of said plurality of light guiding devices at an optical axis of an observation optical system; and
  a light attenuating device that prevents the transmitted light, which is a part of the illuminating light entering said light guiding device held at the optical axis and has been transmitted through said light guiding device instead of being reflected by said light guiding device, from being reflected to be allowed to advance toward said light guiding device;
  wherein said light attenuating device is commonly utilized regardless of which of said plurality of light guiding devices is held at the optical axis of the observation optical system.

6. An epi-fluorescence microscope comprising:
  a plurality of light guiding devices each provided to guide an illuminating light emitted by a light source by reflecting the illuminating light to implement an epi-lighting on a test piece, and guide a fluorescent light excited by the illuminating light and generated from the test piece to an observation unit by allowing the fluorescent light to be transmitted as a transmitted light;
  a holding device that selectively holds one of said plurality of light guiding devices at an optical axis of an observation optical system; and
  a light attenuating device that prevents the transmitted light, which is a part of the illuminating light entering said light guiding device held at the optical axis and has been transmitted through said light guiding device instead of being reflected by said light guiding device, from being reflected to be allowed to advance toward said light guiding device, wherein:

said holding device has said plurality of light guiding devices on a straight line which is perpendicular to the optical axis of the observation optical system and selectively holds one of said plurality of light guiding devices at the optical axis of the observation optical system by moving said plurality of light guiding devices along said straight line; and said light attenuating device is commonly utilized regardless of which of said plurality of light guiding devices is held at the optical axis of the observation optical system.

7. An epi-fluorescence microscope comprising:

a plurality of light guiding devices each provided to guide an illuminating light emitted by a light source by reflecting the illuminating light to implement epi-lighting on a test piece, and guide a fluorescent light excited by the illuminating light and generated from the test piece to an observation unit by allowing the fluorescent light to be transmitted;

a holding device that selectively holds one of said plurality of light guiding devices at an optical axis of an observation optical system; and a light attenuating device that prevents a transmitted light, which is a part of the illuminating light entering said light guiding device held at the optical axis and has been transmitted through, instead of being reflected by, said light guiding device that is held at the optical axis, from being reflected to be allowed to advance toward said light guiding device, wherein:

said holding device is a turret device capable of rotating around a rotational axis extending almost parallel to the optical axis of the observation optical system and having said plurality of light guiding devices mounted radially along an arch around the rotational axis, and has a cylindrical unit formed around the rotational axis; and said light attenuating device is provided within said cylindrical unit.

8. An epi-fluorescence microscope according to claim 7, wherein:

said light attenuating device is provided at a bottom portion of said cylindrical unit.

9. An epi-fluorescence microscope according to claim 8, wherein:

the bottom portion of said cylindrical unit is provided at a side opposite to the test piece as to the rotational axis.

* * * * *